United States Patent Office.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

BLUE DYE AND PROCESS OF MAKING SAME.

SPECIFICATION forming part of Letters Patent No. 544,699, dated August 20, 1895.

Application filed December 18, 1891. Serial No. 415,515. (Specimens.) Patented in England August 26, 1890, No. 13,443; in Austria-Hungary November 28, 1890, No. 35,494 and No. 58,417; in France December 6, 1890, No. 210,033, and in Italy April 27, 1891, XXV, 29,631, LVIII, 100.

*To all whom it may concern:*

Be it known that we, MORITZ ULRICH and JOHANN BAMMANN, doctors of philosophy, chemists, subjects of the Emperor of Germany, residing at Elberfeld, Germany, assignors to the FARBENFABRIKEN, VORMALS FR. BAYER & Co., of Elberfeld, have invented a new and useful Improvement in the Manufacture of Direct-Dyeing Coloring-Matters, (for which the aforesaid Farbenfabriken have already obtained Letters Patent in England, No. 13,443, dated August 26, 1890; in France, No. 210,033, dated December 6, 1890; in Austria-Hungary, No. 35,494 and No. 58,417, dated November 28, 1890, and in Italy, XXV, No. 29,631, and LVIII, No. 100, dated April 27, 1891,) of which the following is a specification.

Our invention relates to the production of a new coloring-matter by combining one molecular proportion of tetrazodiphenyl chloride with two molecular proportions of the sodium salt of that amidonaphtholdisulpho acid which results when the mononitro derivative of the naphthalene trisulpho acid described in the German Patent, No. 38,281, dated September 2, 1885, is reduced and the resulting naphthylamine trisulpho acid is melted with alkalies at temperatures from about 200° to 210° centigrade and which is a beta disulpho acid of one-eighth amidonaphthol.

In carrying out our process practically we proceed as follows: A paste of benzidine sulphate containing 18.4 kilos, by weight, of benzidine is, after the addition of muriatic acid, diazotised in the well-known manner by fourteen kilos, by weight, of sodium nitrite and the resulting solution of tetrazodiphenyl chloride is allowed to flow slowly at about from 5° to 10° centigrade, and on adding sodium carbonate in excess into the watery solution of 72.6 kilos, by weight, of the sodium salt of the amidonaphtholdisulpho acid obtained by melting with alkalies at temperatures from about 200° to 210° centigrade the naphthylamine trisulpho acid, which is formed by reducing the mononitroderivative of the naphthalene trisulpho acid described in the German Patent No. 38,281, dated September 2, 1885. It is necessary to maintain the liquid alkaline by the addition of sodium carbonate during the whole process.

The formation of the new coloring-matter begins immediately and is finished after about twenty-four hours.

The greater part of the dye-stuff separates, and that quantity which has remained dissolved can easily be precipitated by the addition of common salt. When the coloring-matter has been perfectly separated, it is filtered off and dried in the usual manner.

Our new dye-stuff corresponds to the following formula:

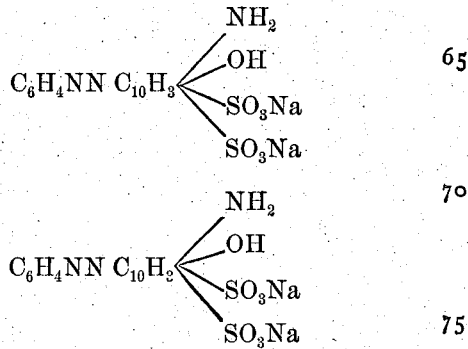

and when dried and finely powdered is a grayish-black powder. In water it is pretty easily soluble with deep-blue color, showing only a slight red tinge, and it separates out of its watery solutions in dark-blue flakes on the addition of common salt. In sodium carbonate and ammonia it dissolves with pure-blue color, in soda lye with reddish-blue color, and when an excess of the latter reagent is employed a dark precipitate is separated out of the alkaline violet solution. By the addition of mineral acids a dark-blue precipitate forms, while the supernatant liquid assumes a reddish color. It is dissolved with greenish-blue color by concentrated sulphuric acid, and on adding water to this sulphuric-acid solution a finely-powdered blue precipitate is immediately separated, which dissolves with the same color in an excess of water. It dyes cotton in soap-baths a pure blue fast to alkaline.

From the analogous tolidine derivative—that is, the dye-stuff obtained by combining one molecular proportion of tetrazo-ditolylechloride with two molecular proportions of the one-eighth amidonaphthol disulpho acid, and which is claimed separately—our new coloring-matter, which is derived from benzidine and contains two carbon and four hydrogen atoms less than the former, mainly differs by its shades produced on cotton in soap-baths, as the benzidine derivative dyes a blue showing a slight reddish tinge, while the shades produced by the tolidine derivative possesses a greenish hue.

Having now described our invention and in what manner it can be performed, that which we claim as new, and desire to secure by Letters Patent, is—

1. The process for producing a blue direct dyeing coloring matter which consists in combining one molecular proportion of tetrazo-diphenyl chloride with two molecular proportions of the ⅛ amidonaphthol disulpho acid hereinbefore described.

2. As a new product the dye stuff having the formula hereinbefore stated, and which when dried and finely powdered forms a grayish black powder forming a reddish blue in water from which dark blue flakes separate on adding common salt, in sodium carbonate and ammonia it dissolves with pure blue color, in soda lye with reddish-blue color and from these solutions mineral acids throw down a dark blue precipitate the supernatant fluid assuming a reddish color, by concentrated sulphuric acid it is dissolved with greenish blue color and on adding water to this solution a finely powdered blue precipitate is immediately separated which dissolves in an excess of water with the same color, and which dyes cotton in soap baths a pure blue fast to alkalies.

In testimony whereof we have signed our names in the presence of two subscribing witnesses.

MORITZ ULRICH.
JOHANN BAMMANN.

Witnesses:
WM. ESSENWEIN,
RUDOLPH FRICKE.